(12) United States Patent
Strongrich et al.

(10) Patent No.: US 11,635,256 B2
(45) Date of Patent: Apr. 25, 2023

(54) PROCESS MONITORING AND CONTROL FOR LYOPHILIZATION USING A WIRELESS SENSOR NETWORK

(71) Applicant: Purdue Research Foundation, West Lafayette, IN (US)

(72) Inventors: Andrew Strongrich, West Lafayette, IN (US); Alina Alexeenko, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/588,929

(22) Filed: Jan. 31, 2022

(65) Prior Publication Data

US 2022/0155010 A1 May 19, 2022

Related U.S. Application Data

(63) Continuation of application No. 16/859,835, filed on Apr. 27, 2020, now Pat. No. 11,243,029.

(60) Provisional application No. 62/838,959, filed on Apr. 26, 2019.

(51) Int. Cl.
*F26B 5/06* (2006.01)
*G01N 25/14* (2006.01)

(52) U.S. Cl.
CPC .............. *F26B 5/06* (2013.01); *G01N 25/14* (2013.01)

(58) Field of Classification Search
CPC .. F26B 5/00; F26B 5/06; G01N 25/14; G01N 25/00

USPC ............................................................. 34/92
See application file for complete search history.

(56) References Cited

U.S. PATENT DOCUMENTS

| 3,263,335 | A | * | 8/1966 | Kan | F26B 5/06 34/292 |
| 5,822,882 | A | * | 10/1998 | Anger | F26B 5/06 34/92 |
| 6,971,187 | B1 | * | 12/2005 | Pikal | F26B 5/06 34/92 |
| 8,677,649 | B2 | * | 3/2014 | Bottger | G03B 15/00 34/92 |
| 8,793,896 | B2 | * | 8/2014 | Patel | F26B 5/06 422/186.04 |
| 9,863,699 | B2 | * | 1/2018 | Corbin, III | A01N 1/0263 |
| 10,006,706 | B2 | * | 6/2018 | Luy | F26B 5/065 |

(Continued)

*Primary Examiner* — Stephen M Gravini
(74) *Attorney, Agent, or Firm* — Piroozi-IP, LLC

(57) ABSTRACT

A system to monitor and control a lyophilization process using a wireless network is disclosed which includes one or more wireless pressure and gas temperature sensors adapted to provide pressure and gas temperature measurements of the ambient environment, a lyophilization chamber, wherein the one or more wireless pressure sensors are distributed in one or more lyophilization vial trays, a vacuum pump, adapted to change the pressure with the lyophilization chamber, a heat exchanger adapted to modify temperature within the lyophilization chamber, and a controller adapted to collect pressure and gas temperature data from the one or more wireless pressure and gas temperature sensors, calculate sublimation rate of a product to be lyophilized using the collected pressure and gas temperature data, and adjust one or both of pressure and temperature within the lyophilization chamber such that the calculated sublimation rate stays within a predetermined envelope.

10 Claims, 5 Drawing Sheets

(56) References Cited

U.S. PATENT DOCUMENTS

| | | | |
|---|---|---|---|
| 10,023,857 B2* | 7/2018 | Durance | C12N 1/04 |
| 11,243,029 B2* | 2/2022 | Strongrich | F26B 25/22 |
| 2021/0180865 A9* | 6/2021 | Trout | A61K 9/19 |
| 2022/0080427 A1* | 3/2022 | Crockett | B01L 3/502707 |
| 2022/0155010 A1* | 5/2022 | Strongrich | F26B 5/06 |

* cited by examiner

PROCESS MONITORING AND CONTROL FOR LYOPHILIZATION USING A WIRELESS SENSOR NETWORK

CROSS-REFERENCE TO RELATED APPLICATIONS

The present patent application is a continuation application of the U.S. Non-Provisional patent application Ser. No. 16/859,835, filed Apr. 27, 2020, to be issued as U.S. Pat. No. 11,243,029 to Strongrich et al., which is related to and claims the priority benefit of U.S. Provisional Patent Application Ser. No. 62/838,959, filed Apr. 26, 2019, the contents of each of which are hereby incorporated by reference in its entirety into the present disclosure.

STATEMENT REGARDING GOVERNMENT FUNDING

This invention was made with government support under IIP1602061 awarded by the National Science Foundation. The government has certain rights in the invention.

TECHNICAL FIELD

The present disclosure generally relates to a process for optimizing and control of lyophilization process using a wireless sensor network, and particularly to a method for determining sublimation rate of a solvent from an arbitrary formulation during the lyophilization process in real time.

BACKGROUND

This section introduces aspects that may help facilitate a better understanding of the disclosure. Accordingly, these statements are to be read in this light and are not to be understood as admissions about what is or is not prior art.

Freeze-drying is a low-pressure, low-temperature condensation pumping process widely used in manufacture of bio-pharmaceutical products for removal of solvents by sublimation. The products are manufactured in a controlled, low-pressure environment maintained in a freeze-dryer. The resulting flow structure in a freeze dryer and the process dynamics involves a complex interplay of many design parameters. Current designs of freeze-dryers are often based on a combination of legacy designs and expensive experiments used to modify them for new requirements. The need for increased capacity has been the major driver in design of new freeze drying systems. Efficiency of freeze-drying process remains constant, since the basic design of a freeze-dryer has not changed significantly for several decades. The advancement of freeze-drying technology is hampered by complexity of the coupled heat and multi-phase mass transfer in a vacuum environment. Such processes do not render themselves readily to simple analytical descriptions and depend strongly on specific configuration of the freeze-dryer. One major issue in low efficiency is lack of information in sublimation rate. As a result freeze-drying requires longer than needed in order to be conservative with the sublimation to avoid damaging active ingredients by deleterious impact of too fast of sublimation.

Therefore, there is an unmet need for a novel approach for an efficient freeze-drying process that can non-invasively provide important information about the rate of sublimation for achieving optimum conditions for freeze-drying.

SUMMARY

A non-invasive method to monitor and control of lyophilization of a frozen product solution to remove solvents is disclosed. The method includes installing one or more wireless pressure and gas temperature sensors configured to fit into a lyophilization vial tray disposed in a lyophilization chamber having a plurality of product vials. The wireless pressure and gas temperature sensors are distributed among the product vials being lyophilized thereby providing spatial pressure and gas temperature variations. The method also includes collecting the spatial pressure and gas temperature information from said wireless pressure and gas temperature sensors. Furthermore, the method includes calculating sublimation rate of the solution. The method also includes adjusting pressure and temperature within the lyophilization chamber such that the calculated sublimation rate stays within a predetermined envelope.

Another non-invasive method for measuring sublimation rate of a frozen product during a lyophilization process to remove a solvent is disclosed. The method includes installing one or more wireless pressure and gas temperature sensors configured to fit into a lyophilization vial tray disposed in a lyophilization chamber, the tray housing a plurality of product vials, wherein said wireless pressure and gas temperature sensors are distributed among the product vials being lyophilized thereby providing spatial pressure and gas temperature variations. The method also includes collecting pressure data from said wireless pressure and gas temperature sensors. Furthermore, the method includes calculating sublimation rate of said frozen product being lyophilized using the collected pressure and gas temperature data.

A system to monitor and control a lyophilization process using a wireless network is also disclosed. The system includes one or more wireless pressure and gas temperature sensors. Each wireless sensor includes a housing fluidly coupled to ambient environment of the housing, a power supply disposed in the housing, an electronics module, electrically coupled to the power supply, the electronics module comprising a microcontroller and a wireless transceiver, a pressure and gas temperature sensor coupled to the electronic module and adapted to provide pressure measurements of the ambient environment of the housing. The system also includes a lyophilization chamber having one or more lyophilization vial trays. The one or more wireless pressure and gas temperature sensors are distributed in the one or more lyophilization vial trays. The system further includes a vacuum pump, adapted to change the pressure with the lyophilization chamber, and a heat exchanger adapted to modify temperature within the lyophilization chamber. The system also includes a controller. The controller is adapted to collect pressure data from the one or more wireless pressure and gas temperature sensors, and calculate sublimation rate of a product to be lyophilized using the collected pressure and gas temperature data.

DETAILED DESCRIPTION

Figure 1A:
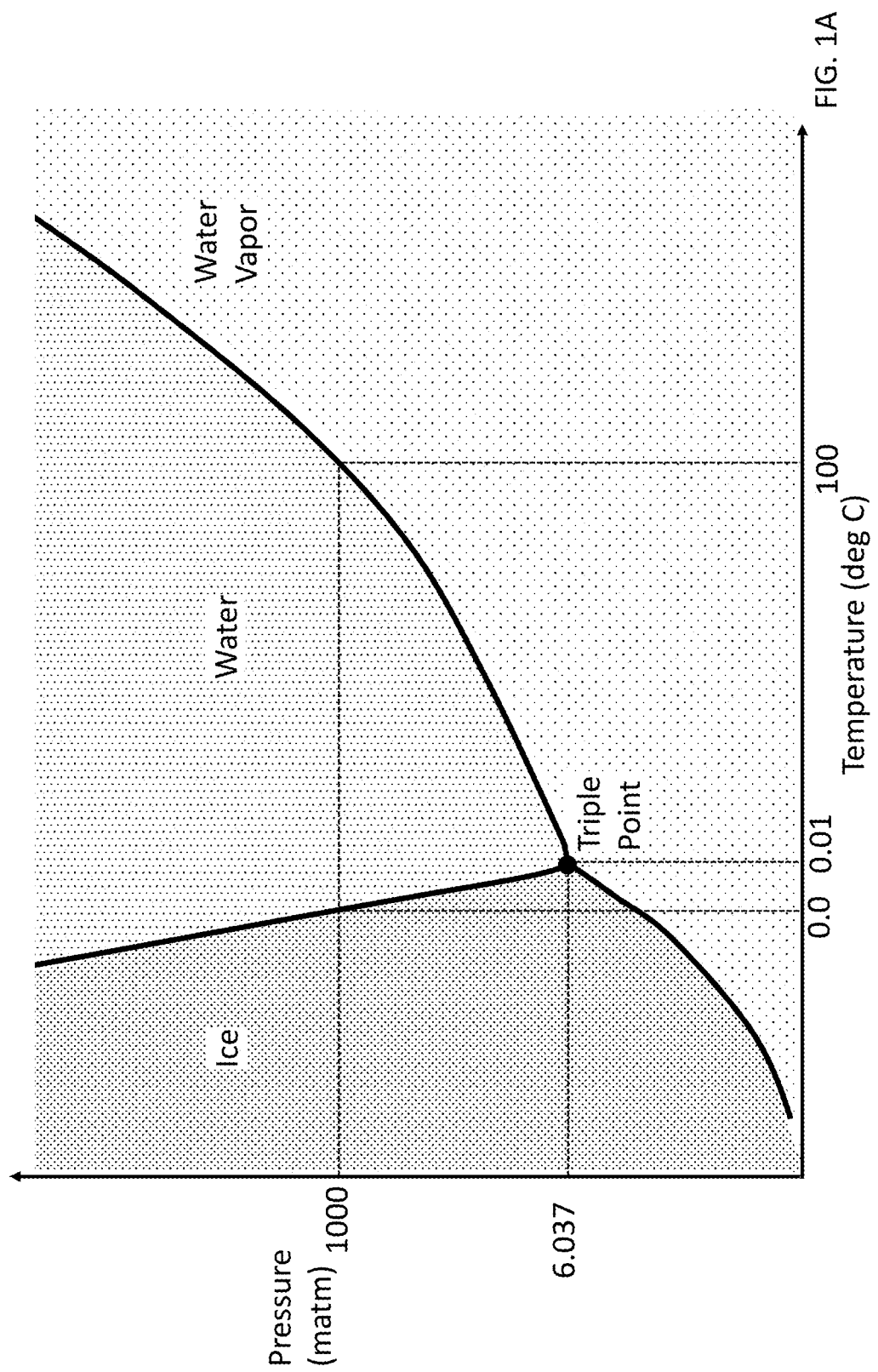
FIG. 1A is a phase diagram for water.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure, the term "about" can allow for a degree of variability in a value or range, for example, within 10%, within 5%, or within 1% of a stated value or of a stated limit of a range.

In the present disclosure, the term "substantially" can allow for a degree of variability in a value or range, for example, within 90%, within 95%, or within 99% of a stated value or of a stated limit of a range.

A novel approach for an efficient freeze-drying process that can non-invasively provide important information about the rate of sublimation for achieving optimum conditions for freeze-drying is disclosed. Most pharmaceuticals contain a certain amount of water-based vehicle in which the active ingredient is mixed and made into a solution. The process of freeze-drying (lyophilization) is the removal of water from the solution for the purpose of significantly extending shelf life of a pharmaceutical by 1) freezing; 2) applying vacuum causing sublimation; 3) typically a secondary drying process; and 4) packaging. To better understand sublimation, reference is made to FIG. 1A, which is a phase diagram for water. As seen in FIG. 1A, at 1000 matm water ice melts to water at 0.0° C. (i.e., melting point). Similarly, at 1 atm, water becomes water vapor (boiling point at 100° C.). At pressures below the critical point (i.e., 0.006 atm), ice directly converts to water vapor (i.e. sublimates). The optimum rate at which water sublimates without damaging the active ingredients of the pharmaceuticals is of great interest. The triple point where the three regions (i.e., ice, water, and water vapor) intersect into a point is at about 0.01° C. and 6.037 matm.

In a typical lyophilization process, the solution is initially frozen via direct contact with a cooled shelf in the range of −30° C. and −60° C. at or about atmospheric pressure (i.e., 1000 matm) for a predetermined amount of time. The purpose of this process is to separate the solvent from the solute. Referring to FIG. 1A, this freezing cycle is about the 1 atm line, however, very close to ordinate. In this region, water molecules become 100% ice. Thereafter, a primary drying cycle begins with extremely low pressures (e.g., between about 1 matm to about 0.1 matm) at or near 0° C. Referring to FIG. 1A, this primary drying cycle is near the abscissa at about 0.0° C. As the pressure is dropped from about 1 atm to the stated range, water molecules crosses the ice to water vapor boundary directly without entering the water phase. The transfer is called sublimation. As discussed above, the rate at which this primary sublimation occurs is of great concern. Too fast of a rate can cause irreparable damage to active ingredients of the pharmaceuticals that are the subject of freeze drying. The main challenge is that sublimation rate may vary for each vial of pharmaceutical based on a host variables. The sublimation rate can provide information about the health of the pharmaceuticals by correlating the rate to temperature of the pharmaceuticals to ensure health. The primary drying phase lasts a predetermined amount of time.

The lyophilization process may also include a secondary drying process, where while temperature may be at a higher range (e.g., between about 10° C. and 40° C.), the pressure is still very low (in the range of about 0.02 matm to about 0.04 matm), again for a predetermined amount of time. Even at this higher temperature, since the pressure is very low, the pharmaceutical remains well in the water vapor range of the water phase diagram. The final stage is packaging the pharmaceutical while under vacuum.

While in FIG. 1A a phase diagram is shown for water, it should be understood that similar phase diagram can be drawn for a variety of other solvents (i.e., vehicles). Thus the concepts applied here are applicable to water-based solvents, as well as other types of solvents.

Since the sublimation rate is of great interest several studies in the prior art have focused on understanding the factors controlling the solvent sublimation rate in a vacuum chamber. For example, one such study identified poor thermal contact between the vial and the shelf as the rate limiting resistance to heat transfer. The design of the product chamber affects local pressure and sublimation rate of the product. The shelf area, shelf separation, location of the shelf with respect to ductwork, the area and length-to-diameter ratio of the duct all play a role in impacting the flow in the chamber. Regardless of the orientation and physical configurations of the lyophilization chamber, a robust way to measure sublimation rate of pharmaceuticals is important.

Knowledge of this variable provides useful information on the product state (e.g. product temperature) during drying. The cycle is constrained by two limiting factors: the collapse temperature of the product (i.e. the highest temperature the product can withstand without losing structural integrity) and the condensing rate of the freeze dryer. The goal of the process is therefore to maximize the sublimation rate while obeying these constraints. To this end, sublimation rate is traditionally estimated using the product temperature, gravimetric measurement, or Tunable Diode Laser Absorption Spectroscopy (TDLAS). These methods are outlined below:

Product Temperature Measurement

Product temperature may be measured directly via thermocouple or similar probes or indirectly using a pressure-rise test. In the pressure-rise method, the product chamber is isolated from the condenser chamber (where the vacuum is being pulled) for a brief period. The rate of pressure rise over time (due to the subliming ice) provides an estimate of sublimation rate, and hence, the product temperature. This process is repeated at regular intervals throughout the process and is considered an invasive technique.

Gravimetric Measurement

The gravimetric measurement method extracts sublimation rate through regular sampling of product mass over the course of drying. The samples may be weighed either by extraction from the chamber at regular intervals during drying via an interlock or by running for a specified period and then stoppering all vials. In the latter case the cycle is interrupted and the samples are removed and individually measured. Although highly invasive, the latter technique provides information on local sublimation rate. This data is advantageous as it allows any non-uniformities in drying rate to be quantified. In nearly all cases, the vials near the edge of the stack dry more quickly due to higher magnitudes of radiative and convective heat transfer, thereby resulting in a spectrum of variability. This method is thus invasive and time-consuming. Furthermore, the gravimetric measurement method with its stoppering requirement has an additional issue that vials that are removed for measurement have significant water/ice and therefore must be discarded, resulting in lack of efficiency. In addition, this method is only used for engineering or simulated runs, and never in production. Tunable Diode Laser Absorption Spectroscopy (TDLAS)

The TDLAS method employs a series of lasers located within the duct separating the product and the condenser chambers. The passage of water vapor through the sampling area produces a phase and amplitude shift which is detectable through demodulation. The TDLAS method is considered to be the industry-standard in sublimation rate measurement as it is non-invasive, accurate (to within 10%), and can be implemented at the production scale. In many cases however, the high cost or lack of lyophilizer compatibility can be prohibitive.

The sublimation rate measurement methods outlined above have specific advantages and disadvantages. None are able to simultaneously provide a spatially resolved and non-invasive measure of sublimation rate. Methods based on product temperature and TDLAS rely on models or approximations to derive sublimation rate. In most cases, uncertainties achieve levels of around 10% which may be unacceptable for sensitive pharmaceuticals.

Furthermore, none of the above-outlined methods are currently employed in a closed-loop fashion. That is, they are purely passive and allow-open loop monitoring and are at best only able to monitor sublimation rate.

Figure 1B:
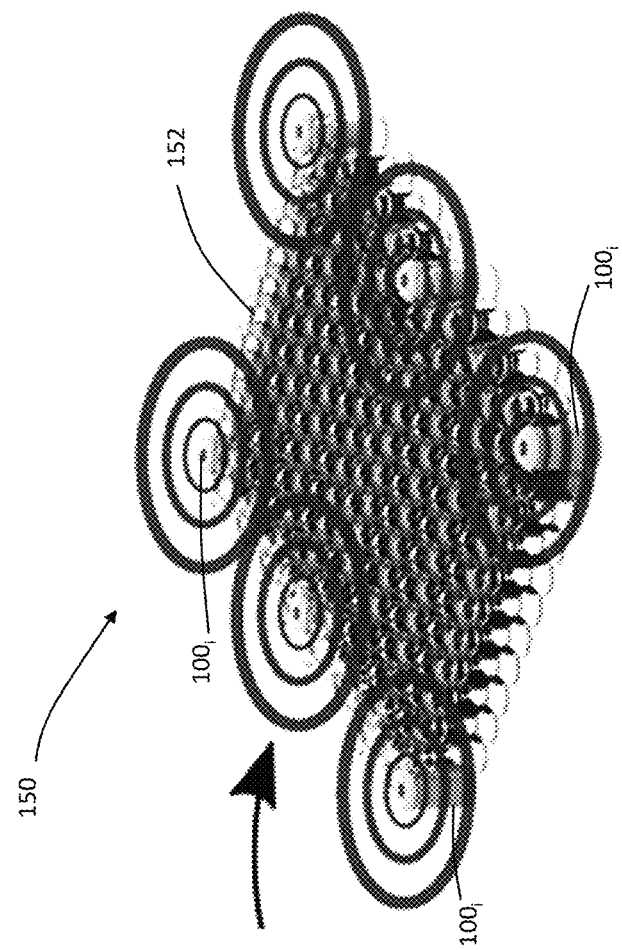
FIG. 1B is an exploded perspective view of a pressure and gas temperature sensor system of the present disclosure in one panel and placement of the pressure and gas temperature sensor systems in a product vial tray of a lyophilization system in another panel.
Figure 1B:
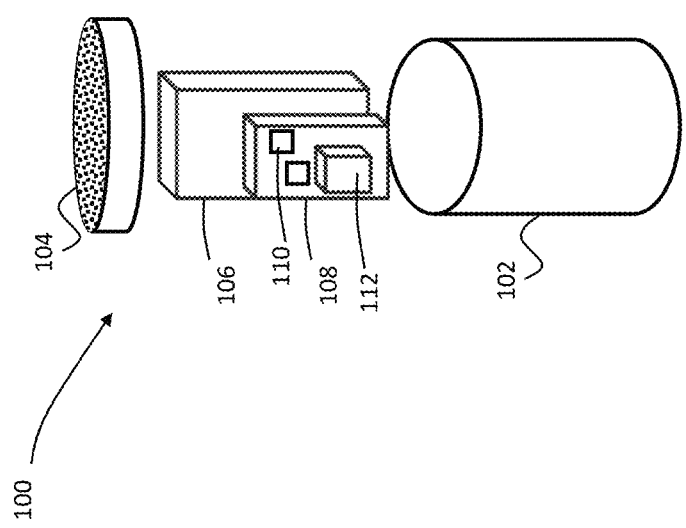

This present disclosure provides a more accurate measurement of local sublimation rates, and offers an efficient and controllable process of freeze-drying (lyophilization). The novel system and method according the present disclosure for sublimation rate measurement relies on sampling of the local pressure and gas temperature surrounding the vials using wireless vacuum sensors. The sensor may be gas-dependent or gas-independent. The gas-dependent method necessitates proper calibration in a pure water vapor environment. The pressure and gas temperature sensors are located in "dummy" vials which have similar dimensions to the product vials. This facilitates direct integration into the vial stack at various positions. An illustration is shown in FIG. 1B which is an exploded perspective view of the pressure and gas temperature sensor system 100 of the present disclosure. The pressure and gas temperature sensor system 100 includes a housing 102 and a lid 104. The housing 102 is fluidly coupled to ambient conditions, e.g., by holes (not shown) such that pressures inside and outside the housing 102 are the same. The pressure and gas temperature sensor system 100 also includes a battery pack 106 which can be a rechargeable battery (e.g., a lithium ion battery) that is adapted for low pressure and low temperature operations. Electrically and mechanically coupled to the battery pack 106 is an electronics module 108 housing various electronic components 110, such as a controller or a processor, and a pressure sensor 112. The battery pack 106 and the electronics module 108 coupled thereto are adapted and configured to fit inside the housing 102, with the lid 104 closed.

The pressure and gas temperature sensor system 100, as shown in FIG. 1B, is placed in various locations on the vial tray 150 holding vials 152 of pharmaceuticals. While, the pressure and gas temperature sensor systems 100 are shown at the periphery of the vial tray 150, it is to be understood that the pressure and gas temperature sensor systems 100 can be located any place on the vial tray 150 in place of a vial 152. To this end, the pressure and gas temperature sensor system 100 is sized to be interchangeably replacing vials 152 on the vial tray 150.

The pressure and gas temperature sensor system 100 also includes a wireless communication channel using a variety of shortrange wireless radio frequency (RF) communication protocol, e.g., a wide-area network (WAN), and in particular, a low-power WAN (LPWAN), or other networks and associated protocols known to a person having ordinary skill in the art. Several platforms are known in LPWAN. These include DASH7, Sigfox, LoRa, Bluetooth Low Energy (BLE), ANT, chirp spread spectrum, weightless, Wize, and other protocols known to a person having ordinary skill in the art. Other platforms may include WiFi as part of wireless local area network (WLAN) including the IEEE 802.11 protocol, known to a person having ordinary skill in the art. The communication protocol may include a header with an identification sequence prepared by each of the pressure and gas temperature sensor systems 100 for accurate and pinpoint pressure and gas temperature sensing capabilities.

With the local pressures and gas temperatures known, the sublimation rate is determined via the standard Navier-Stokes system of equations, known to a person having ordinary skill in the art. In this case, the pressure and gas temperature distribution within the flow-field is known and the system is solved to determine the unknown boundary condition (injection velocity corresponding to sublimation rate).

Figure 2:
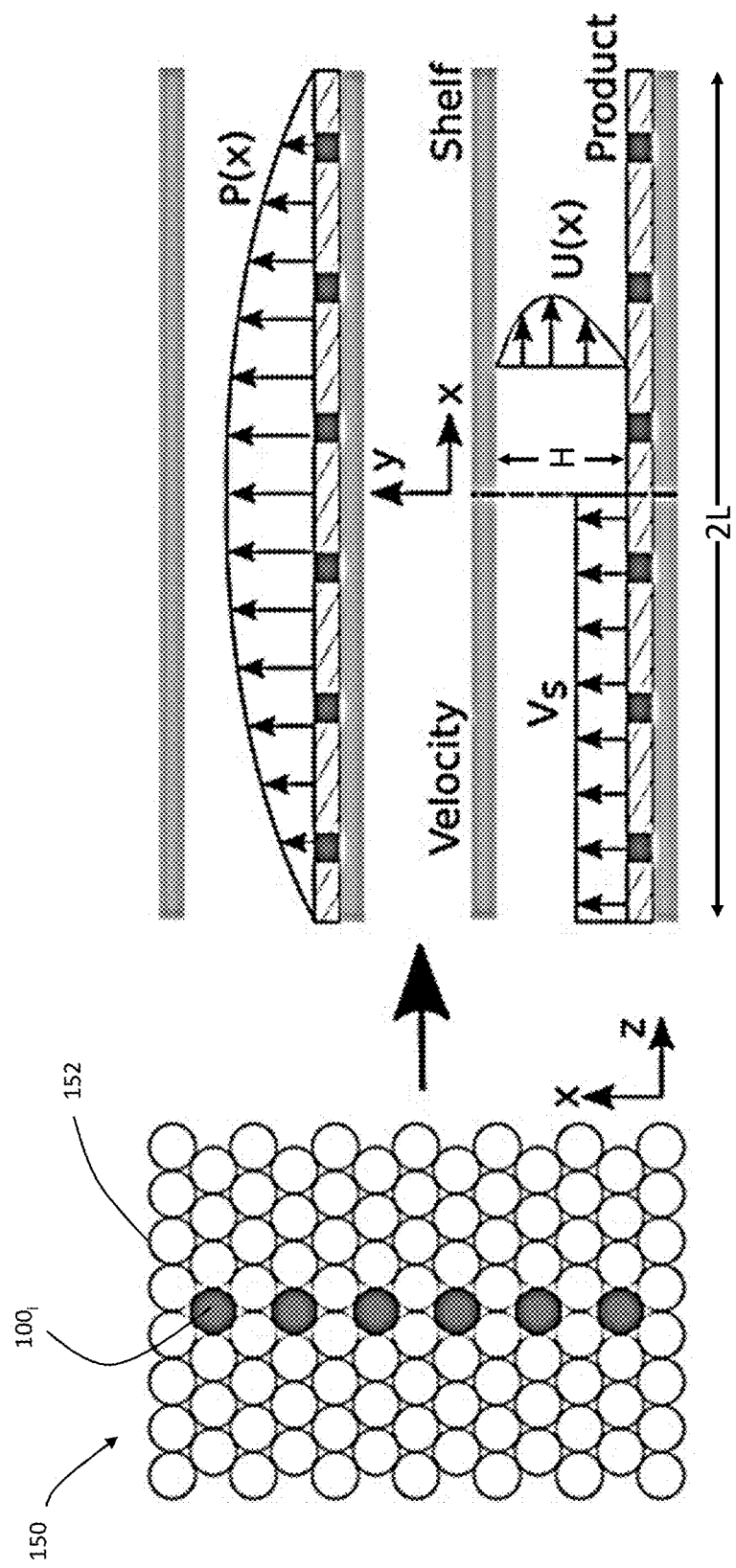
FIG. 2 is a top view of the vial tray of FIG. 1B with inter-dispersed pressure and gas temperature sensor system and other product vials shown in one panel, and a schematic of a boundary condition of sublimation in another panel.

Referring to FIG. 2, a top view of the vial tray 150 with inter-dispersed pressure and gas temperature sensor system 100 (shown as $100_i$) are other vials 152 is shown. Parameters associated with the Navier-Stokes system of equations are shown schematically.

The system and method of the present disclosure is inherently non-invasive as it requires no interruption in cycle or probe insertion into the product cake. Additionally, if several sensors are deployed throughout the vial stack (also referred to herein as the vial tray 150), the method may be used, to quantify the local sublimation rate, features which current standard instrumental techniques are lacking, in particular accurate and non-invasive benefit of the system and method of the present disclosure.

To explain the pressure and gas temperature measurements to sublimation rate transference, a fluid mechanical model is applied to estimate product sublimation rate in real time via measured pressure distribution (P(x), see FIG. 2. To establish the modeling, the well-known Navier-Stokes system of equations in two dimensions is presented. Navier-Stokes system of equations named after French engineer and physicist Claude-Louis Navier and Irish physicist and mathematician George Gabriel Stokes takes into assumption a Newtonian fluid and applied Newton's second law (F=ma) in x, y, and z directions in a Cartesian coordinate system as well as continuity.

$$\frac{\partial u}{\partial x} + \frac{\partial v}{\partial y} = 0 \tag{1}$$

$$u\frac{\partial u}{\partial x} + v\frac{\partial u}{\partial y} = -\frac{1}{\rho}\frac{dp}{dx} + \frac{\mu}{\rho}\left(\frac{\partial^2 u}{\partial x^2} + \frac{\partial^2 u}{\partial^2 y}\right) \tag{2}$$

$$u\frac{\partial v}{\partial x} + v\frac{\partial v}{\partial y} = -\frac{1}{\rho}\frac{dp}{dy} + \frac{\mu}{\rho}\left(\frac{\partial^2 v}{\partial x^2} + \frac{\partial^2 v}{\partial y^2}\right) \tag{3}$$

where u is the fluid velocity vector in the x direction which can have variations in in x, y, and z directions, p is the fluid pressure again having components in x, y, and z directions, ρ is the fluid density (found via the ideal gas law using pressure and gas temperature measurements and assumed to be incompressible), v is the fluid velocity vector in the y direction which can have variations in in x, y, and z directions, and μ is the dynamic viscosity (i.e., with dependence on temperature, however, for the purposes of this application temperature is maintained at a constant level equal to the average of all sensor measurements, thus μ is constant). The Navier-Stokes system of equations are typically used by applying known boundary conditions (see equation (11)) in order to solve for pressure and flow field velocity. In the challenge of freeze-drying, the boundary conditions are not known, however, the present disclosure advantageously utilizes pressure information and solves the boundary conditions in reverse using the equations provided in the present disclosure. In particular, as discussed below, an initial boundary condition is assumed, and pressure is calculated, and then compared with pressure data obtained from the wireless pressure and gas temperature sensors, and a penalty function (see equation (17)) thus generated representing the difference between calculated pressures and measured pressures. This penalty function is then minimized to provide a numerical solution to the boundary conditions. The sublimation rate is then calculated (see equation (18) below) by integrating the boundary condition associated with the minimum difference between calculated and actual pressures (i.e., by minimizing the penalty function).

To simplify the above system of equations and reduce its order the number of velocity terms is reduced to a single variable through introduction of a non-dimensional stream function, ψ.

$$\psi(\xi, \eta) = X(\xi)Y(\eta) \quad (4)$$

Here, ξ represents the non-dimensional coordinate in the x-direction (x/L) and η in the y-direction (y/H). The stream function is separable in terms of X and Y and, by definition, is constant along a streamline. Application to velocity terms yields $$u = \frac{1}{H}\frac{\partial \psi}{\partial \eta} \quad (5)$$

$$v = -\frac{1}{L}\frac{\partial \psi}{\partial \xi} \quad (6)$$

where, H is the height of the channel shown in FIG. 2, L is the half length (i.e., the entire length of the channel in FIG. 2 is shown as 2L).

Substituting the above non-dimensional expressions for velocity into equations (2) and (3) and assuming that transverse gradients (i.e. η-direction) are negligible, the x-momentum and y-momentum equations become $$\frac{1}{H^2L}(XX'Y'^2 - XX'YY'') = -\frac{1}{\rho L}\frac{dp}{d\xi} + \frac{\mu}{\rho}\left(\frac{1}{H^2L}X''Y' + \frac{1}{H^3}XY'''\right) \quad (7)$$

$$\frac{1}{H^2L}(X'^2YY' - XX''YY') = -\frac{1}{\rho H}\frac{dp}{d\eta} - \frac{\mu}{\rho}\left(\frac{1}{L^3}X'''Y + \frac{1}{LH^2}X'Y''\right) \quad (8)$$

where X and Y are profile functions in ξ, η directions, respectively, and ', '', and ''' are first, second and third order derivatives with respect to the associated parameters.

Pressure-velocity coupling is used to reduce the system to a single unknown via the curl operator. Taking the derivative of equation (7) with respect to r' and equation (8) with respect to ξ and combining, the pressure terms are eliminated.

$$\frac{1}{H^2}(2XX'Y'Y'' - XX'(Y'Y'' + YY''')) -$$

$$\frac{1}{L^2}(2X'X''YY' - YY'(X'X'' + XX''')) -$$

$$\frac{\mu}{\rho}\left(\frac{1}{HL}X''Y'' - \frac{L}{H^3}XY^{(4)} - \frac{H}{L^3}X^{(4)}Y - \frac{1}{HL}X''Y''\right) = 0 \quad (9)$$

where (4) represents the fourth derivative with respect to the associated parameter.

The original system of three equations has been reduced to a single equation with two unknowns. Further simplification is possible through assumption of the velocity profile shape and application of the boundary conditions. Equation (9) is fourth-order in Y and third-order in X, requiring seven boundary conditions in total.

To capture the effects of the asymmetric injection, the axial velocity profile, u(ξ, η) is approximated by a third-order polynomial. According to equation (6), Y will be a fourth-order expression in terms of η.

$$Y(\eta) = a + Hb\eta + \frac{H^2}{2}c\eta^2 + \frac{H^3}{3}d\eta^3 + \frac{H^4}{4}e\eta^4 \quad (10)$$

Equation (10) is reduced to a single parameter through introduction of the appropriate boundary conditions. Assuming no-slip conditions at the south and north boundaries, the boundary conditions in terms of velocities become $$u(\xi, 0) = 0 \quad u(\xi, 1) = 0 \quad v(\xi, 0) = v_w(\xi) \quad v(\xi, 1) = 0 \quad (11)$$

Or in terms of Y, $$Y(0) = 0 \quad Y(1) = 0 \quad Y'(0) = v_w(\xi) \quad Y'(1) = 0 \quad (12)$$

Application of the velocity profile terms to equation (10) reduces Y to a single unknown, e. Here, e represents the shape factor and determines the asymmetry of the velocity profile. Following substitution and simplification of the boundary condition system, expressions for Y and its derivatives are provided below.

$$Y(\eta) = -1 + (3 + H^4e)\eta^2 - (2 + 2H^4e)\eta^3 + eH^4\eta^4 Y'(\eta) \quad (13)$$

$$Y'(\eta) = 2(3 + H^4e)\eta - 3(2 + 2H^4e)\eta^2 + 4eH^4\eta^3 Y''(\eta)$$

-continued
$$Y''(\eta) = 2(3 + H^4 e) - 6(2 + 2H^4 e)\eta + 12eH^4\eta^2 Y'''(\eta)$$
$$Y'''(\eta) = -6(2 + 2H^4 e) + 24eH^4\eta Y^{(4)}(\eta)$$
$$Y^{(4)}(\eta) = 24eH^4$$

The X term in equation (4) is determined through application of equation (1). Results for X and its derivatives become $$X(\xi) = L \int v_w(\xi) d\xi \quad (14)$$
$$X'(\xi) = Lv_w(\xi)$$
$$X''(\xi) = Lv'_w(\xi)$$
$$X'''(\xi) = Lv''_w(\xi)$$
$$X^{(4)}(\xi) = Lv'''_w(\xi)$$

The equation sets (13) and (14) are substituted into equation (9) to yield an expression in terms of the channel dimensions, H and L, transverse coordinate, $\eta$, and the injection profile, $v_w(\xi, \eta)$. Similar to the Karman-Polhausen boundary layer method, known to a person having ordinary skill in the art, the properties within the boundary layer are averaged via integration of equation (9) over $\eta$, reducing the system to a single unknown. Assuming the injection profile is prescribed, the resulting unknown shaping variable, e, is given by $$e(\xi) = \frac{15}{H^3}\left(\frac{H^3 vX^{(4)} - H^2 LXX''' + H^2 X'X'' - 12L^3 XX'}{H^4 vX^{(4)} + 60HL^3 XX' + 720L^4 vX}\right) \quad (4)$$

where $v$ is the kinematic viscosity (i.e., $\mu/\rho$)

With the shaping parameter known, the stream function computation is straightforward using equations (13), (14), and (4). Returning to equation (7), the pressure gradient term is solved for and integrated over $\eta$ and $\xi$ to yield $$P(\xi) = \int_0^\xi \int_0^1 \left(\frac{\rho}{H^2}(XX'YY'' - XX'Y'^2) + \frac{\mu}{HL}X''Y' + \frac{\mu L}{H^3}XY'''\right)d\eta d\xi \quad (16)$$

Here, it is assumed that no pressure variation exists between the channel outlet and the pressure transducer on the upper surface of the lyophilizer. The pressure distribution in equation (16) is non-linear in the velocity inlet boundary condition along the south wall, requiring an iterative solver to invert. The flow matching procedure is classified as an inverse parameter estimation problem.

Determination of pertinent flow parameters using the above analysis requires knowledge of the injection profile. In many internal flow applications, such as lyophilization, this information is not known and so the direct solution from the known pressure profile is not possible. Using a variety of sensors however, the local flow properties (e.g. static pressure and temperature) can be measured directly. By formulating as an inverse parameter estimation problem, the injection profile (injection mass flow rate) can be determined over the course of several iterations.

To set up the flow matching problem, a, injection velocity profile is first assumed by discretizing the domain into a series of piecewise continuous segments. To obtain the stream function, derivatives of the assumed injection velocity profile are taken. The velocity profile and its derivatives are used to solve for the static pressure from equation (16). The computed pressure is compared to the measured distribution, forming the penalty function, J.

$$J = \frac{1}{2}\int (P - P_{meas})^2 d\xi \approx \frac{1}{2}\sum (P_n - P_{meas,n})^2 \Delta\xi \quad (17)$$

The sublimation rate is then defined by equation (18) provided below.

$$\dot{m}(\xi) = \rho L \int_0^1 v_w(\xi) d\xi \quad (18)$$

where $\dot{m}(\xi)$ represents sublimation rate in kg/s/m.

Minimization of the penalty function is performed using any multivariate optimizer. The solution procedure is as follows:

1. Begin with a predetermined initial injection velocity profile, $v_w(\xi)$, i.e., boundary condition, a
2. Compute the corresponding pressure distribution,
3. Compute the penalty function in equation (17) using the results from Step (2) and the measured pressure distribution,
4. Determine penalty function sensitivities relative to the inputs,
5. Execute optimization algorithm to find the search direction,
6. Compute the new injection profile estimate using latest search direction,
7. Repeat Steps (2)-(5) until first-order optimality is achieved, and
8. Use equation (18) to calculate sublimation rate.

As discussed above, the sensor includes an electronics module (e.g., 108 shown in FIG. 1B) a Pirani sensor (e.g., the pressure sensor 112 shown in FIG. 1B). The Pirani sensor contains the sensing filament and resistance thermometer for self-balancing and ambient temperature measurement whereas the electronics module houses driver circuitry, microcontroller, and wireless transceiver used to perform the measurement. The sensor and battery are loaded into the package, forming the complete device as shown in FIG. 1B.

The wireless pressure and gas temperature sensor system 100 employs a self-balancing bridge architecture containing a MEMS Pirani gauge and a resistance thermometer. The wireless MEMS pressure and gas temperature sensor 100 (WMP) are located in the vial tray (150, see FIG. 1B) at various locations. The Pirani gauge is a gas-dependent device which measures ambient pressure using the heat transferred to surrounding gas. During operation, the Pirani filament temperature is raised and maintained at a specified temperature above the ambient temperature (as measured by the resistance thermometer). Any changes in ambient pressure will result in a corresponding change in heat transfer coefficient. Thus, a drop in ambient pressure requires lower applied power to maintain the filament at the target temperature. Use of the wireless MEMS pressure sensors is shown in FIG. 3A which is a schematic of the use of WMPs in the processing chamber of a freeze-drying system (WMP1 and WMP2 are shown for example only, however, it should be understood than there can be many more). A schematic of a reference circuit used for measuring the ambient pressure is shown in FIG. 3B.

Figure 3B:
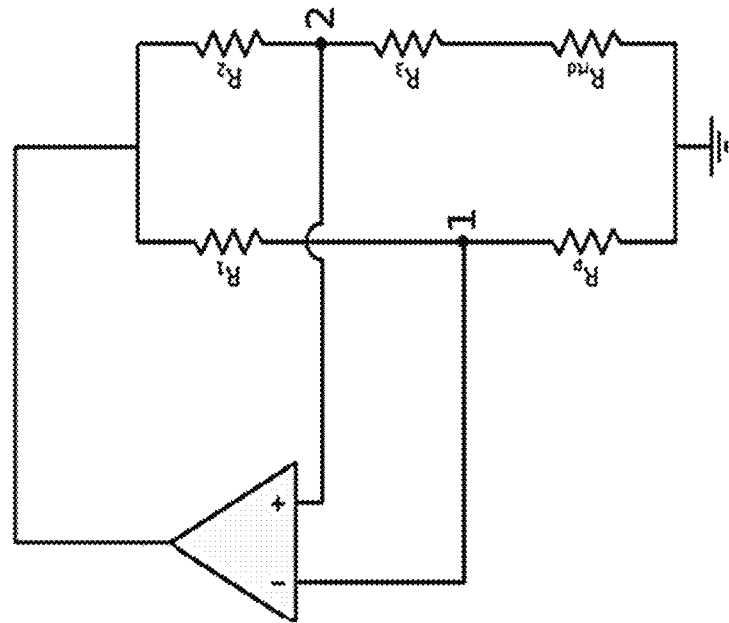
FIG. 3B is a schematic of a reference circuit used for measuring the ambient pressure and temperature by a WMP of the present disclosure.
Figure 3A:
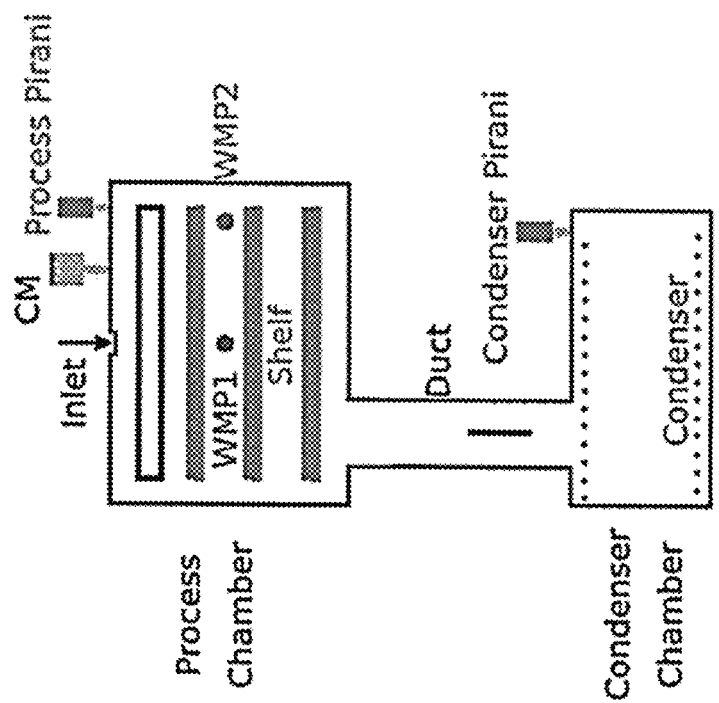
FIG. 3A is a schematic of wireless micro electromechanical sensor pressure and gas temperature sensors (WMPs) in the processing chamber of a freeze-drying system where (WMP1 and WMP2 are shown for example only, however, it should be understood than there can be many more).

Referring to FIG. 3B, a self-balancing bridge is shown which used to achieve partial temperature compensation. Using this method, the reference resistor ($R_{rtd}$) provides a measure of the ambient temperature. This information is needed for the determination of gas density and dynamic viscosity. If $R_1$ and $R_2$ are properly selected, a change in $R_{rtd}$ resistance due to an ambient temperature fluctuation will lead to corresponding change in the temperature of the Pirani filament, $R_P$. For example, if the ambient temperature surrounding the device increases, the Pirani filament temperature will increase by the same amount. This linearization technique is sufficient for small changes in temperature, however larger changes will cause the non-linear radiative heat transfer to become significant. To mitigate this effect, the sensor is calibrated over a range of pressures and temperatures. The resistor $R_3$ sets the Pirani filament temperature relative to the ambient temperature. Measurement of the power dissipated by the Pirani filament and the ambient temperature requires sampling of bridge voltage between $R_P$ and $R_1$ and $R_{rtd}$ and $R_3$. These voltages are quantified using an analog-to-digital converter located on the electronics module 108 (see FIG. 1B).

Figure 4:
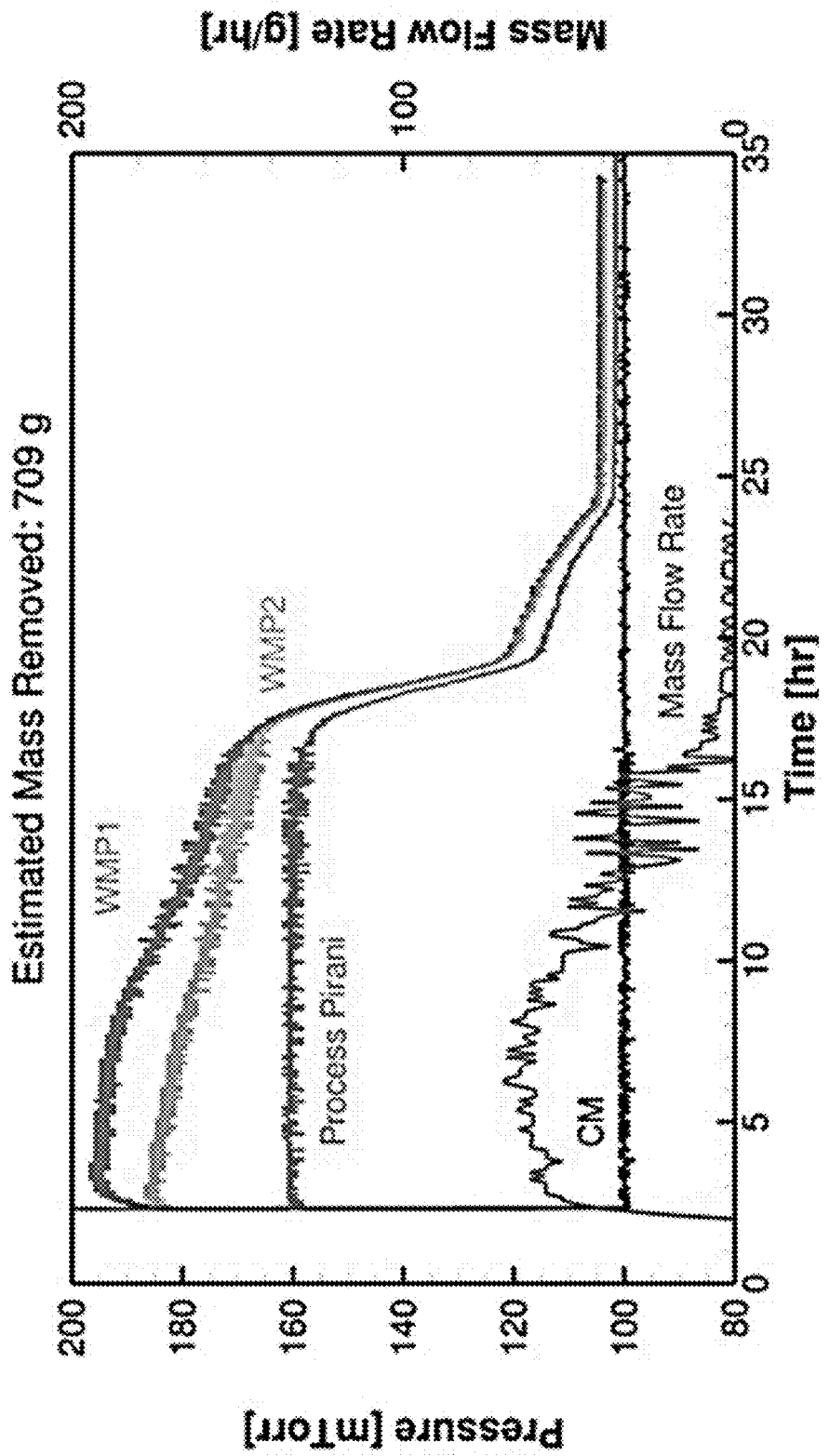
FIG. 4 is a complex graph including pressure on one axis in mTorr and mass flow rate in (g/hr) on another axis, both of which are plotted against time in hours

Referring to FIG. 4 example output of the system shown in FIG. 3A is shown which is a complex graph including pressure on one axis in mTorr and mass flow rate in (g/hr) on another axis both of which are plotted against time in hours. While the CM is at a relatively constant pressure (about 100 mTorr), it can be seen that WMP1 and WMP2 produce varying drop rates before both settle out at the CM's pressure after about 25 hours. Similarly, the mass flow rate shows a sudden increase in transfer rate prior to reducing to zero after about 20 hours.

Such outputs can provide significant guidance and accuracy for lyophilization, and particularly, sublimation rate, of the pharmaceuticals to avoid issues where active ingredients are damaged when the sublimation rate is too fast, while providing sufficiently high lyophilization efficiency. Such outputs can also be used as a feedback signal in a control system to slow the lyophilization when the outputs indicate crossing a predetermined threshold of sublimation rate.

The WMPs of the present disclosure are calibrated in pure water vapor environment. The water vapor is sublimed from an external reservoir and released into the chamber via a proportional valve.

During the calibration process, the water in the reservoir is frozen, eliminating spurious pressure excursions due to degassing or boiling. The vacuum in the reservoir is maintained by the lyophilizer's vacuum system. The proportional valve is driven by an external controller which regulates the pressure around the desired setpoint. The temperature within the lyophilizer is also regulated, offsetting the errors introduced from the linearization.

A wireless Capacitance Manometer (CM) mounted to the process chamber wall samples the absolute chamber pressure and broadcasts the measurement to the controller. The host also broadcasts a locally generated setpoint. A controller compares these two values and adjusts the valve accordingly to maintain the target pressure. Gas composition is verified using the Residual Gas Analyzer (RGA).

The wireless pressure and gas temperature sensor system of the present disclosure provides the following benefits: a) Real-time wireless data communication, compact size, high accuracy and sensitivity, low power, and low cost; b) wireless vacuum sensors placed within vial stack measuring pressure gradient across the shelf system; c) fluid injection rate determined using fluid mechanical model—Mass flow rate based on measured density and known shelf area; and d) measured gas pressure and temperature distribution can also be used for direct process control.

Those having ordinary skill in the art will recognize that numerous modifications can be made to the specific implementations described above. The implementations should not be limited to the particular limitations described. Other implementations may be possible.

The invention claimed is:

1. A system to monitor and control a lyophilization process using a wireless network, comprising:
   one or more wireless pressure and gas temperature sensors, each comprising:
      a housing fluidly coupled to ambient environment of the housing,
      a power supply disposed in the housing,
      an electronics module, electrically coupled to the power supply, the electronics module comprising a microcontroller and a wireless transceiver,
      a pressure sensor coupled to the electronics module and adapted to provide pressure and gas temperature measurements of the ambient environment of the housing;
   a lyophilization chamber having one or more lyophilization vial trays, wherein the one or more wireless pressure and gas temperature sensors are distributed in the one or more lyophilization vial trays;
   a vacuum pump, adapted to change pressure within the lyophilization chamber;
   a heat exchanger adapted to modify temperature within the lyophilization chamber; and
   a controller adapted to:
      collect pressure and gas temperature data from the one or more wireless pressure and gas temperature sensors,
      calculate sublimation rate of a product to be lyophilized using the collected pressure and gas temperature data, and
      adjust one or both of the pressure and temperature within the lyophilization chamber such that the calculated sublimation rate stays within a predetermined envelope.

2. The system according to claim 1, wherein each of the one or more wireless pressure and gas temperature sensors includes a micro electromechanical sensor Pirani gauge and resistance thermometer.

3. The system according to claim 1, the electronics module further comprising a reference measurement circuit including one or more comparators adapted to provide a digital output representing ambient pressure of the housing.

4. The system according to claim 1, the wireless transceiver adapted to communicate output of the one or more wireless pressure and gas temperature sensors to an external system.

5. The system according to claim 1, wherein the controller calculates the sublimation rate by:
   applying an initial predetermined boundary condition of a channel representing space adjacent the one or more lyophilization vial trays within the lyophilization chamber;
   iteratively minimizing a penalty function associated with difference between calculated and the collected pressure data, including:

computing pressure and gas temperature information at distributed positions of the one or more wireless pressure and gas temperature sensors, calculating difference between the computed pressure information and the collected pressure data, calculating the penalty function based on the calculated difference between the computed pressure information and the collected pressure data and an associated boundary condition, determining a new boundary condition which causes reduction of the calculated penalty function and recalculating the penalty function based on the new boundary condition until the penalty function is minimized; and calculating the sublimation rate by applying the boundary condition associated with the minimized penalty function.

6. A system to monitor and control a lyophilization process using a wireless network, comprising:

one or more wireless pressure and gas temperature sensors, each comprising:
  a housing fluidly coupled to ambient environment of the housing,
  a power supply disposed in the housing,
  an electronics module, electrically coupled to the power supply, the electronics module comprising a microcontroller and a wireless transceiver,
  a pressure sensor coupled to the electronics module and adapted to provide pressure and gas temperature measurements of the ambient environment of the housing;

a lyophilization chamber having one or more lyophilization vial trays, wherein the one or more wireless pressure and gas temperature sensors are distributed in the one or more lyophilization vial trays;

a vacuum pump, adapted to change pressure within the lyophilization chamber;

a heat exchanger adapted to modify temperature within the lyophilization chamber; and a controller adapted to:
  collect pressure and gas temperature data from the one or more wireless pressure and gas temperature sensors,
  calculate sublimation rate of a product to be lyophilized using the collected pressure and gas temperature data, and
  remove a solvent from the product based on the calculated sublimation rate.

7. The system according to claim 6, wherein each of the one or more wireless pressure and gas temperature sensors is includes a micro electromechanical sensor Pirani gauge and resistance thermometer.

8. The system according to claim 6, the electronics module further comprising a reference measurement circuit including one or more comparators adapted to provide a digital output representing ambient pressure of the housing.

9. The system according to claim 6, the wireless transceiver adapted to communicate output of the one or more wireless pressure and gas temperature sensors to an external system.

10. The system according to claim 6, wherein the controller calculates the sublimation rate by:

applying an initial predetermined boundary condition of a channel representing space adjacent the one or more lyophilization vial trays within the lyophilization chamber;

iteratively minimizing a penalty function associated with difference between calculated and the collected pressure data, including:
  computing pressure and gas temperature information at distributed positions of the one or more wireless pressure and gas temperature sensors,
  calculating difference between the computed pressure information and the collected pressure data,
  calculating the penalty function based on the calculated difference between the computed pressure information and the collected pressure data and an associated boundary condition,
  determining a new boundary condition which causes reduction of the calculated penalty function and recalculating the penalty function based on the new boundary condition until the penalty function is minimized; and
  calculating the sublimation rate by applying the boundary condition associated with the minimized penalty function.

* * * * *